(12) United States Patent
Bono et al.

(10) Patent No.: US 11,162,539 B2
(45) Date of Patent: Nov. 2, 2021

(54) CONSTANT VELOCITY JOINT AND ASSEMBLY METHOD THEREFOR

(71) Applicant: HONDA MOTOR CO., LTD., Tokyo (JP)

(72) Inventors: Yasuharu Bono, Tokyo (JP); Taisuke Sakakibara, Tokyo (JP); Taichi Sasaki, Tokyo (JP); Junji Yoshida, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 149 days.

(21) Appl. No.: 16/681,876

(22) Filed: Nov. 13, 2019

(65) Prior Publication Data

US 2020/0158183 A1 May 21, 2020

(30) Foreign Application Priority Data

Nov. 19, 2018 (JP) .............................. JP2018-216244

(51) Int. Cl.
*F16D 3/06* (2006.01)
*F16D 3/10* (2006.01)
*F16D 3/223* (2011.01)

(52) U.S. Cl.
CPC ................. *F16D 3/06* (2013.01); *F16D 3/10* (2013.01); *F16D 3/223* (2013.01);
(Continued)

(58) Field of Classification Search
CPC ... F16D 3/06; F16D 3/10; F16D 3/223; F16D 2003/22313; F16D 2250/0084;
(Continued)

(56) References Cited

U.S. PATENT DOCUMENTS 1,273,963 A * 7/1918 Watts ........................ F16C 3/02
464/124
2,932,180 A * 4/1960 Smith-Pert .............. F16D 3/065
464/167

FOREIGN PATENT DOCUMENTS

CN 108443340 8/2018
DE 255 972 A1 * 4/1988 .................... 464/111
(Continued)

OTHER PUBLICATIONS

Japanese Office Action for Japanese Patent Application No. 2018-216244 dated Sep. 8, 2020.
(Continued)

*Primary Examiner* — Greg Binda
(74) *Attorney, Agent, or Firm* — Amin, Turocy & Watson, LLP (57) ABSTRACT

A constant velocity joint includes spherical rollers. At least parts of first inner bottom wall portions provided on an inner bottom wall surface of a cylindrical portion of the constant velocity joint are located in closer proximity to the side of an opening of the cylindrical portion than second inner bottom wall portions. When the spherical rollers are disposed at an innermost location inside the cylindrical portion and the axial directions of the spherical rollers are perpendicular to the axial direction of the cylindrical portion, at least parts of the first inner bottom wall portions abut against inner side outer circumferential surface portions of the spherical rollers, and the second inner bottom wall portions are separated away from outer side outer circumferential surface portions of the spherical rollers.

7 Claims, 9 Drawing Sheets

(52) U.S. Cl.
CPC .............. *F16D 2003/22313* (2013.01); *F16D 2250/0084* (2013.01); *Y10S 464/905* (2013.01); *Y10T 29/49826* (2015.01)

(58) Field of Classification Search
CPC ............. F16D 2001/103; F16D 3/2055; Y10T 29/49826; Y10S 464/905
USPC ................................................ 464/111, 124
See application file for complete search history.

(56) References Cited

FOREIGN PATENT DOCUMENTS

| | | |
|---|---|---|
| JP | 2008-089148 | 4/2008 |
| JP | 2008-190621 | 8/2008 |
| JP | 2018-025230 | 2/2018 |

OTHER PUBLICATIONS

Chinese Office Action for Chinese Patent Application No. 201911133193.7 dated Sep. 3, 2021.

\* cited by examiner

CONSTANT VELOCITY JOINT AND ASSEMBLY METHOD THEREFOR

CROSS-REFERENCE TO RELATED APPLICATION

This application is based upon and claims the benefit of priority from Japanese Patent Application No. 2018-216244 filed on Nov. 19, 2018, the contents of which are incorporated herein by reference.

BACKGROUND OF THE INVENTION

Field of the Invention

The present invention relates to a constant velocity joint which is equipped with spherical rollers that transmit torque between an outer member and an inner member, as well as to a method of assembling such a constant velocity joint.

Description of the Related Art

For example, in Japanese Laid-Open Patent Publication No. 2008-089148, a method is disclosed of assembling a so-called cross-groove type constant velocity joint, in which torque is transmitted between an outer member and an inner member through a plurality of balls. In such an assembly method, first, the inner member in which a shaft hole and ball grooves are provided, and balls that are retained in the ball grooves via a retainer (cage) are accommodated inside a bottomed cylindrical portion of the outer member, and are disposed at an innermost location in the outer member. In addition, in a state in which the inner member is in contact with an inner bottom wall surface of the outer member, the transmission shaft is inserted and fitted into the shaft hole of the inner member. Consequently, the constant velocity joint is obtained, in which the inner member that is connected to the transmission shaft and the balls are disposed inside the cylindrical portion.

SUMMARY OF THE INVENTION

Incidentally, a so-called tripod type constant velocity joint is known, which transmits torque between an outer member and an inner member via annularly shaped spherical rollers. In this type of constant velocity joint, in order to increase transmittable torque, it may be considered to increase the diameter of the spherical rollers.

When the spherical rollers, the diameters of which have been increased, are mounted on the inner member, both end sides of the spherical rollers in the radial direction are disposed more on outer sides than both ends of the shaft hole of the inner member in the axial direction. Therefore, in order to apply the above-described method of assembling the constant velocity joint, when the spherical rollers are mounted on the inner member and disposed at an innermost location in the cylindrical portion of the outer member, the outer circumferential surfaces of the spherical rollers, instead of the inner member, abut against an inner bottom wall surface of the cylindrical portion. Consequently, when the spherical rollers, in the radial direction thereof, are inclined in directions in which end portions thereof facing toward the opening of the cylindrical portion (hereinafter also referred to as opening side end portions) and the axis of the shaft hole of the inner member are in close proximity to each other, a concern arises in that portions of the shaft hole are blocked by the spherical rollers.

In particular, in the cylindrical portion, which is obtained by machining a metal material or the like into a bottomed cylindrical shape, an inclined portion, which is closer in proximity to the side of the opening as it progresses from a center side toward an outer side in a radial direction, is easily formed on the inner bottom wall surface. The spherical rollers, which are in contact with such an inclined portion, are easily inclined in directions in which the opening side end portions block portions of the shaft hole. When portions of the shaft hole are blocked by the spherical rollers, a concern arises in that insertion of the transmission shaft into the shaft hole is hindered, and it becomes difficult to efficiently assemble the constant velocity joint.

A principal object of the present invention is to provide a constant velocity joint, which can be assembled in an efficient manner even if the diameter of the spherical rollers is increased.

Another object of the present invention is to provide a method of assembling the aforementioned constant velocity joint.

One aspect of the present invention is characterized by a constant velocity joint comprising spherical rollers configured to transmit torque between an outer member and an inner member, wherein the outer member includes a bottomed cylindrical portion having an opening on one end side thereof, and the inner member and the spherical rollers are disposed inside the cylindrical portion, a first inner bottom wall portion and a second inner bottom wall portion are provided on an inner bottom wall surface of the cylindrical portion, the first inner bottom wall portion is disposed in closer proximity to a center side in a radial direction of the cylindrical portion than the second inner bottom wall portion, and at least a part of the first inner bottom wall portion is formed in closer proximity to a side of the opening than the second inner bottom wall portion, the inner member includes an annular section provided with a shaft hole into which a transmission shaft is inserted and fitted, and holders that protrude from the annular section along radial directions of the annular section, the spherical rollers are annularly shaped and are held rotatably by the holders, an outer circumferential surface of each of the spherical rollers includes an inner side outer circumferential surface portion disposed more on a proximal end side of the holders than a virtual plane passing through a center of the spherical roller in an axial direction and extending along a radial direction of the spherical roller, and an outer side outer circumferential surface portion disposed more on a distal end side of the holders than the virtual plane, and when the spherical rollers are disposed at an innermost location inside the cylindrical portion and the axial directions of the spherical rollers are perpendicular to an axial direction of the cylindrical portion, at least a part of the first inner bottom wall portion, which is a portion facing toward the inner side outer circumferential surface portion, abuts against the inner side outer circumferential surface portion, and the second inner bottom wall portion, which is a portion facing toward the outer side outer circumferential surface portion, is separated away from the outer side outer circumferential surface portion.

Another aspect of the present invention is characterized by a method of assembling a constant velocity joint comprising spherical rollers configured to transmit torque between an outer member and an inner member, the method comprising a roller mounting step of rotatably mounting the spherical rollers having annular shapes, respectively on outer circumferential sides of holders of the inner member, the inner member including an annular section in which a shaft hole is formed, and the holders that protrude from an outer circumference of the annular section along radial directions of the annular section, an insertion step of inserting the inner member and the spherical rollers that are mounted on the holders, from an opening provided on one end side of a bottomed cylindrical portion of the outer member into the cylindrical portion, and a transmission shaft connecting step of inserting and fitting a transmission shaft into the shaft hole of the inner member which is disposed at an innermost location inside the cylindrical portion, wherein a first inner bottom wall portion and a second inner bottom wall portion are provided on an inner bottom wall surface of the cylindrical portion, the first inner bottom wall portion is disposed in closer proximity to a center side in a radial direction of the cylindrical portion than the second inner bottom wall portion, and at least a part of the first inner bottom wall portion is formed in closer proximity to a side of the opening than the second inner bottom wall portion, an outer circumferential surface of each of the spherical rollers includes an inner side outer circumferential surface portion disposed more on a proximal end side of the holders than a virtual plane passing through a center of the spherical roller in an axial direction and extending along a radial direction of the spherical roller, and an outer side outer circumferential surface portion disposed more on a distal end side of the holders than the virtual plane, and when the axial directions of the spherical rollers, which are disposed at the innermost location inside the cylindrical portion, are perpendicular to an axial direction of the cylindrical portion, at least a part of the first inner bottom wall portion, which is a portion facing toward the inner side outer circumferential surface portion, abuts against the inner side outer circumferential surface portion, and the second inner bottom wall portion, which is a portion facing toward the outer side outer circumferential surface portion, is separated away from the outer side outer circumferential surface portion.

According to the present invention, when the spherical rollers are disposed at an innermost location inside the cylindrical portion so that the axial directions of the spherical rollers are perpendicular to the axial direction of the cylindrical portion, at least a part of the first inner bottom wall portion abuts against the inner side outer circumferential surface, and the second inner bottom wall portion is separated away from the outer side outer circumferential surface. In this case, the spherical rollers are easily inclined in directions in which the outer side outer circumferential surface portions are in close proximity to the second inner bottom wall portion, or stated otherwise, in directions in which the end portions (opening side end portions) facing toward the opening of the outer member separate away from the axis of the shaft hole of the inner member. Consequently, since the opening side end portions of the spherical rollers can be prevented from coming into proximity to the axis of the shaft hole and blocking the shaft hole, the transmission shaft can be efficiently inserted and fitted into the shaft hole. Stated otherwise, even if the diameter of the spherical rollers is increased, the constant velocity joint can be assembled in an efficient manner.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

A preferred embodiment of a constant velocity joint and a method of assembling the same according to the present invention will be presented and described in detail below with reference to the accompanying drawings. In the drawings referred to below, constituent elements that exhibit the same or similar functions and effects are denoted with the same reference characters, and repeated description of such features is omitted.

Figure 1:
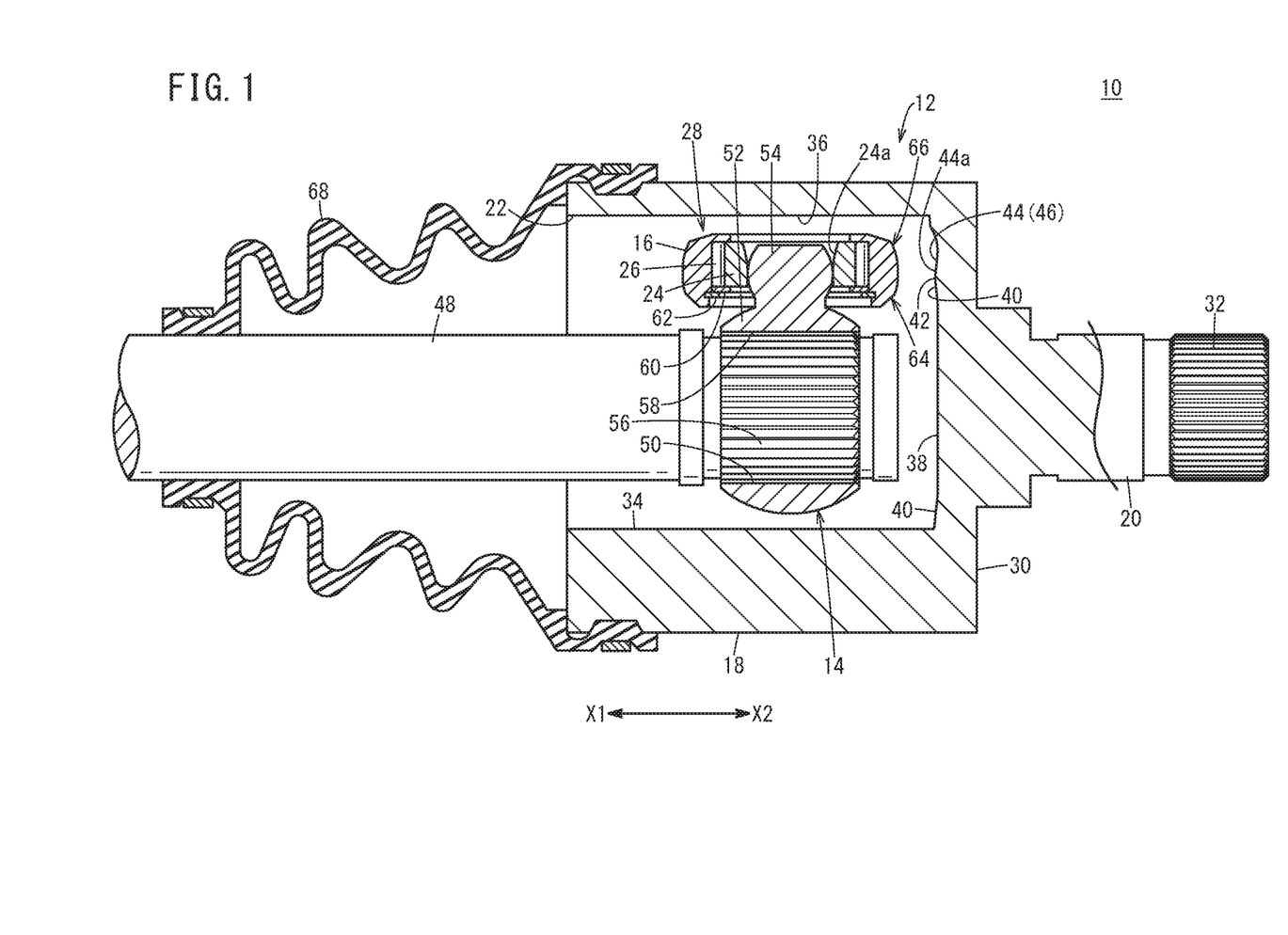
FIG. 1 is a schematic cross-sectional view of principal components of a constant velocity joint according to an embodiment of the present invention.

As shown in FIG. 1, a constant velocity joint 10 is equipped with an outer member 12, an inner member 14, and spherical rollers 16 that transmit torque between the outer member 12 and the inner member 14. The outer member 12 includes a cylindrical portion 18 and a shaft member 20. The cylindrical portion 18 is obtained, for example, by machining a metal material into a bottomed cylindrical shape, and an opening 22 is provided on one end side (the side of the arrow X1) thereof. The inner member 14 and the spherical rollers 16 are provided inside the cylindrical portion 18 through the opening 22. Moreover, according to the present embodiment, as will be described later, the spherical rollers 16 are disposed inside the cylindrical portion 18 in a state in which the spherical rollers 16 constitute roller units 28 together with inner rollers 24, rolling members 26, and the like.

The shaft member 20 is disposed to protrude on an outer bottom wall surface 30 of the cylindrical portion 18. The shaft member 20 is formed, for example, with serrations 32 on a distal end side (the side of the arrow X2), and is capable of being connected via the serrations 32 to a rotary shaft of a vehicle transmission or the like (none of which are shown).

Figure 2:
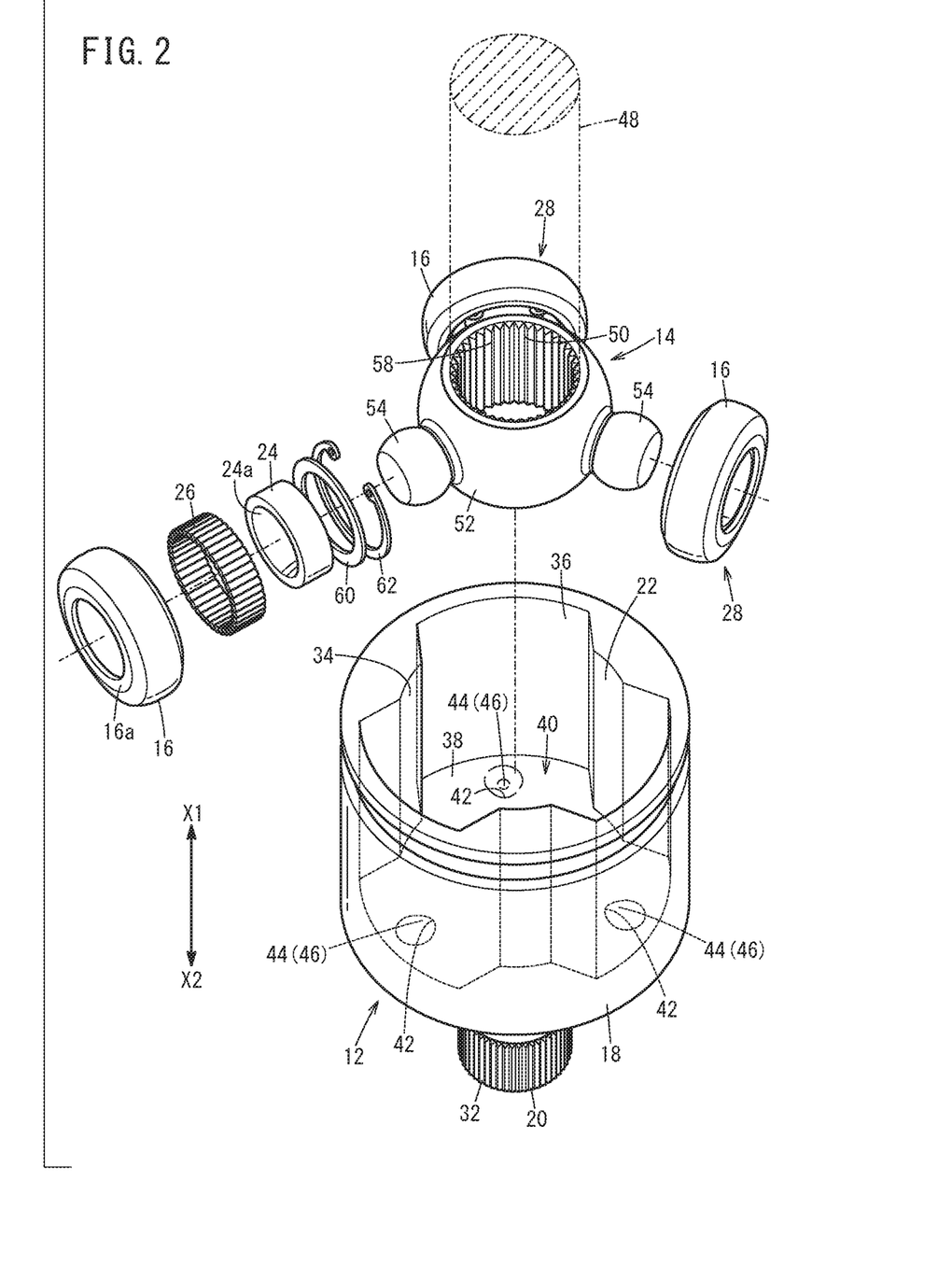
FIG. 2 is an exploded perspective view of an outer member, an inner member, and roller units shown in FIG. 1.

As shown in FIGS. 1 and 2, on an inner circumferential wall 34 of the cylindrical portion 18, guide grooves 36, which extend along the axial direction (the direction of arrows X1 and X2) of the cylindrical portion 18, are formed in plurality at intervals in the circumferential direction of the outer member 12. According to the present embodiment, as shown in FIG. 2, three guide grooves 36, which are spaced apart from each other at intervals of 120° in the circumferential direction of the cylindrical portion 18, are disposed so as to extend respectively along the axial direction of the cylindrical portion 18 from the opening 22 to the vicinity of an inner bottom wall surface 38.

As shown in FIG. 1, on the outer circumferential side of the inner bottom wall surface 38 of the cylindrical portion 18, an inclined portion 40 is formed, which is closer in proximity to the side of the opening 22 (the side of the arrow X1) as it progresses from a center side toward an outer side in the radial direction of the cylindrical portion 18. First inner bottom wall portions 42 and second inner bottom wall portions 44 are disposed with respect to the inclined portion 40. The first inner bottom wall portions 42 are disposed adjacent to the second inner bottom wall portions 44, more on the center side in the radial direction of the cylindrical portion 18 than the second inner bottom wall portions 44.

According to the present embodiment, recesses 46, which are recessed toward a side away from the opening 22, are provided on the second inner bottom wall portions 44, whereby at least parts of the first inner bottom wall portions 42 are in closer proximity to the side of the opening 22 than the second inner bottom wall portions 44. The inner wall surfaces of the recesses 46 are constituted from curved surfaces. Further, each of the recesses 46 includes a reversely inclined portion 44*a*, which is inclined in an opposite direction to the inclination direction of the inclined portion 40 by coming closer in proximity to the side of the opening 22 as it progresses from the outer side toward the center side in the radial direction of the cylindrical portion 18.

As shown in FIG. 2, on the inner bottom wall surface 38 of the cylindrical portion 18, at positions facing toward the other end side (the side of the arrow X2) of the three guide grooves 36, combinations of the first inner bottom wall portions 42 and the second inner bottom wall portions 44 are respectively disposed. More specifically, a total of three sets of the first inner bottom wall portions 42 and the second inner bottom wall portions 44 are provided on the inner bottom wall surface 38 of the cylindrical portion 18, correspondingly to the number of the guide grooves 36.

The inner member 14 includes an annular section 52 provided with a shaft hole 50 into which a transmission shaft 48 is inserted and fitted, and holders 54 that protrude from the annular section 52 into the guide grooves 36. Although not illustrated, one end side (the side of the arrow X1) in the axial direction of the transmission shaft 48 is connected, for example, to a fixed type constant velocity joint such as a Barfield type. As shown in FIG. 1, shaft side serrations 56 are provided at another end portion (an end portion on the side of the arrow X2) of the transmission shaft 48. Hole side serrations 58 that are fitted with the shaft side serrations 56 are provided on the inner circumference of the shaft hole 50. The other end portion of the transmission shaft 48 is inserted and fitted into the shaft hole 50 of the annular section 52, and the shaft side serrations 56 and the hole side serrations 58 are fitted together, thereby connecting the inner member 14 and the transmission shaft 48.

As shown in FIG. 2, three of the holders 54 protrude from the outer circumference of the annular section 52, so as to be separated away from each other at intervals of 120° in the circumferential direction of the annular section 52. The protruding directions of the holders 54 are along radial directions of the shaft hole 50, or in other words, in directions substantially perpendicular to the axis of the shaft hole 50. The substantially cylindrically shaped holders 54 include arcuate outer circumferential surfaces, which bulge outwardly in the radial direction of the holders 54 between the distal end sides and the proximal end sides thereof in the protruding directions. The roller units 28 are mounted on the outer circumferences of the holders 54.

Each of the roller units 28 is constituted by integrally assembling the inner roller 24, the rolling members 26, the spherical roller 16, a pressing ring 60, and a C-ring 62. Hereinafter, when the respective constituent elements of the roller units 28 are retained on the holders 54, the sides that are positioned on the proximal end side in the protruding directions of the holders 54 will simply be referred to as proximal end sides, and the sides that are positioned on the distal end side in the protruding directions of the holders 54 will simply be referred to as distal end sides.

Figure 3A:
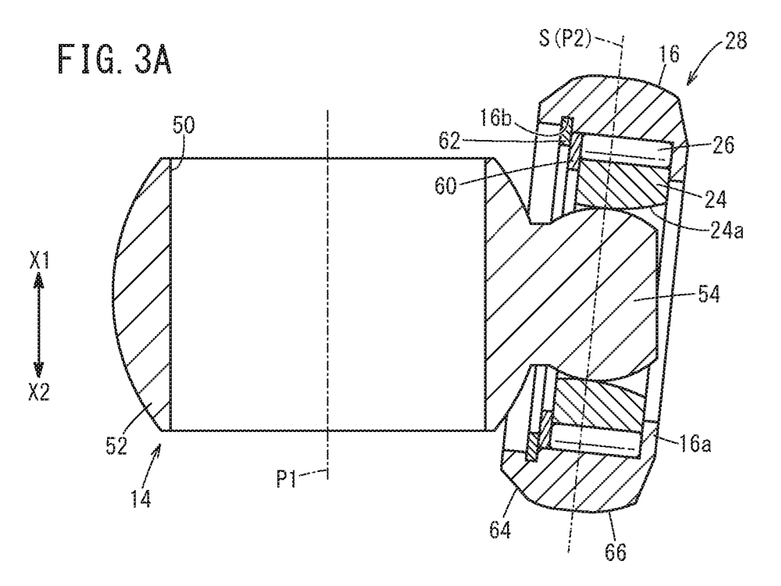
FIGS. 3A and 3B are cross-sectional views for describing how the roller units are swingably attached to an inner member.
Figure 3B:
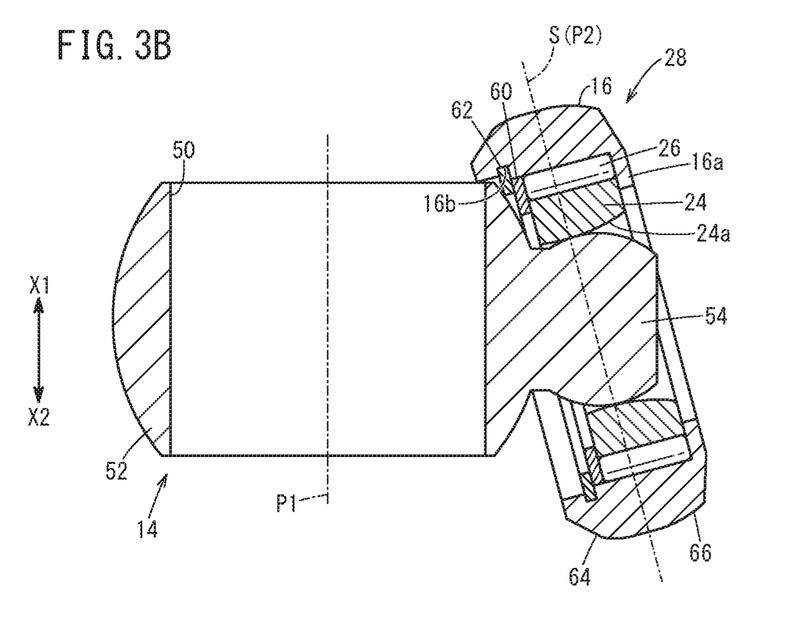

The inner rollers 24 are of annular shapes that are attached to the outer circumferential surfaces of the holders 54. On the inner circumferences of the inner rollers 24, arcuate surfaces 24*a* are provided, which are capable of partially contacting the outer circumferential surfaces of the holders 54. Consequently, the inner rollers 24 are capable of swinging with respect to the holders 54. The roller units 28 in their entirety, which are attached to the holders 54 via the inner rollers 24, are also capable of swinging with respect to the holders 54. More specifically, the protruding directions of the holders 54 and the axial directions of the roller units 28 (spherical rollers 16) can be inclined with respect to each other within a predetermined range. Therefore, for example, as shown in FIGS. 3A and 3B, the radial direction of the spherical rollers 16 (the direction P2 shown in FIGS. 3A and 3B) can be inclined with respect to the axis of the shaft hole 50 (P1 in FIGS. 3A and 3B).

As shown in FIG. 2, a plurality of the rolling members 26, which are in the form of cylindrical rollers, are disposed on the outer circumference of each of the inner rollers 24, in a manner so as to surround the inner roller 24 in the circumferential direction thereof. The respective rolling members 26 are disposed so that the axes of rotation thereof lie along the axial direction of the inner rollers 24. The spherical rollers 16 have annular shapes that are rotatably mounted on the outer circumferential sides of the inner rollers 24 via the rolling members 26. More specifically, the spherical rollers 16 are rotatably and swingably retained on the holders 54 via the inner rollers 24 and the rolling members 26. In this manner, the spherical rollers 16, which are accommodated in the guide grooves 36 in a state of being retained on the holders 54, are capable of rolling inside the guide grooves 36. As shown in FIG. 1, etc., the outer diameter of the spherical rollers 16 is larger than the length of the annular section 52 in the axial direction (the direction of arrows X1 and X2). Therefore, both ends of the spherical rollers 16 in the radial direction are disposed more on outer sides than both ends of the annular section 52 in the axial direction.

Figure 4:
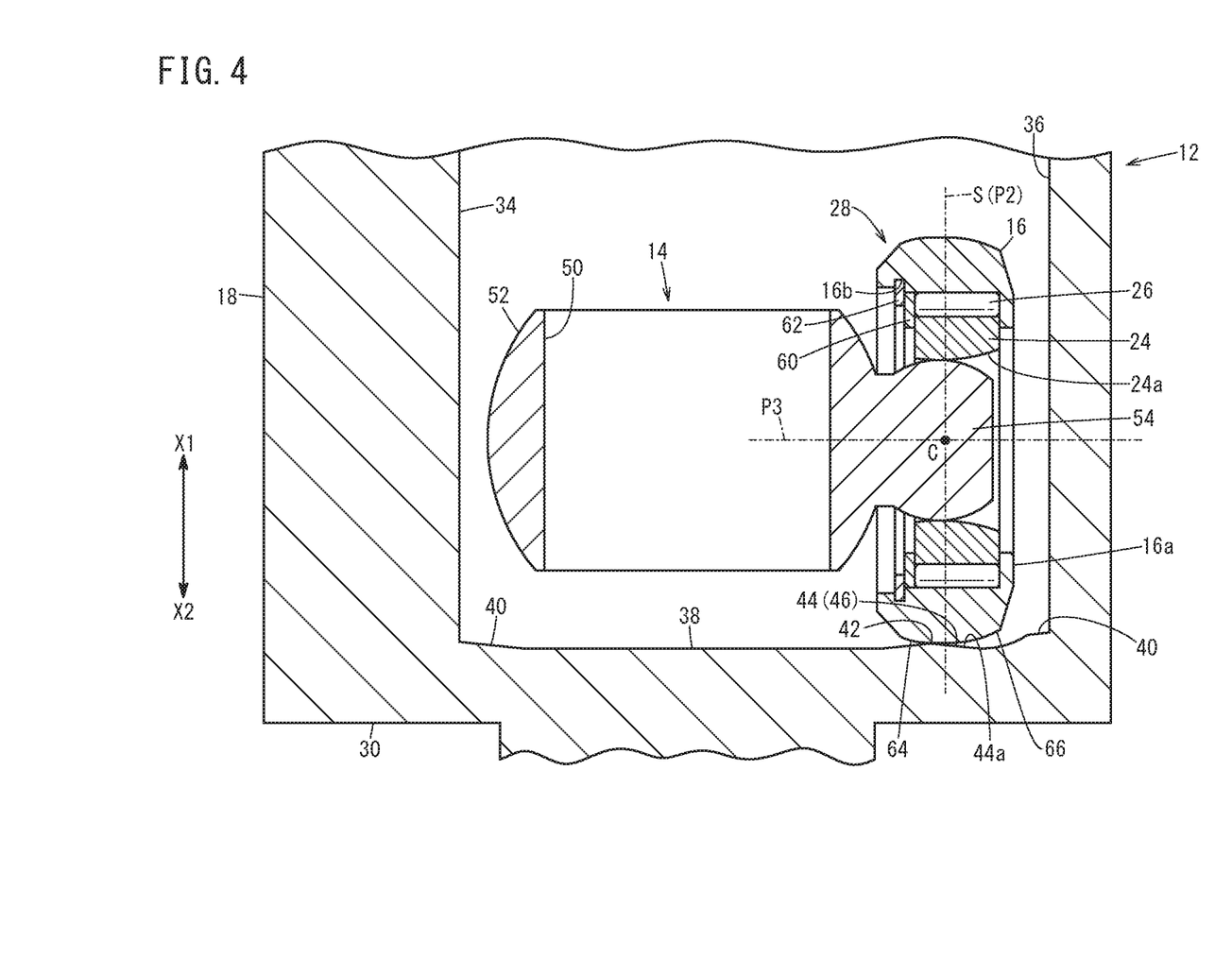
FIG. 4 is a partial cross-sectional view for describing a state in which the inner member and a roller unit are disposed at an innermost location inside a cylindrical portion, and an axial direction of a spherical roller is perpendicular to an axial direction of the cylindrical portion.

As shown in FIG. 4, an outer circumferential surface of each of the spherical rollers 16 includes an inner side outer circumferential surface portion 64, which is disposed in closer proximity to a proximal end side than a virtual plane S that passes through the center C of the spherical roller 16 in the axial direction (shown by P3 in FIG. 4) and extends along the radial direction P2 of the spherical roller 16, and an outer side outer circumferential surface portion 66 disposed more on the distal end side than the virtual plane S.

Figure 5:
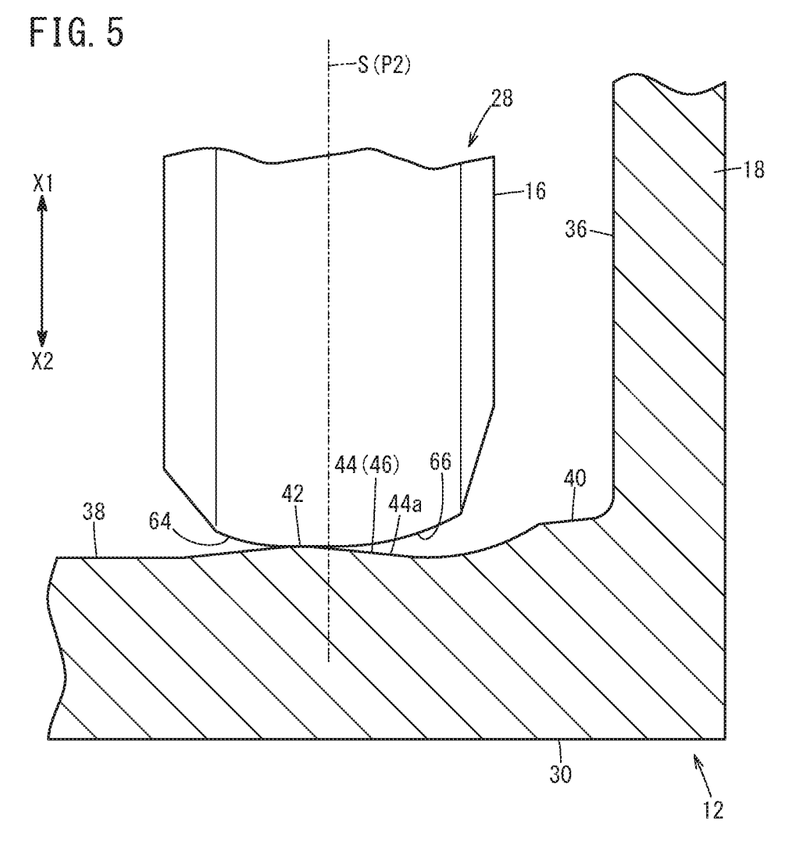
FIG. 5 is an enlarged cross-sectional view of a principal part shown in FIG. 4.

In this instance, a state where the spherical rollers 16 are disposed at an innermost location inside the cylindrical portion 18 and the axial directions of the spherical rollers 16 are perpendicular to the axial direction of the cylindrical portion 18 (the virtual plane S lies along the axial direction of the cylindrical portion 18) will also be referred to hereinafter as a reference state. As shown in FIGS. 4 and 5, in the reference state, the first inner bottom wall portions 42 are portions that face toward the inner side outer circumferential surface portions 64, and at least parts of the first inner bottom wall portions 42 abut against the inner side outer circumferential surface portions 64. Further, in the reference state, the second inner bottom wall portions 44 are portions that face toward the outer side outer circumferential surface portions 66, and are separated away from the outer side outer circumferential surface portions 66.

As shown in FIG. 4, etc., on distal end sides of each of the spherical rollers 16, a distal end surface 16a is provided in a manner so as to cover the entire end surface on the distal end sides of the rolling members 26, and a portion of the end surface on the distal end side of the inner roller 24. An insertion groove 16b into which an outer circumferential portion of the C-ring 62 is inserted is provided on the inner circumference on a proximal end side of each of the spherical rollers 16. The pressing ring 60 is interposed between the C-ring 62 that is inserted into the insertion groove 16b, and the end surface on the proximal end sides of the rolling members 26. The pressing ring 60 covers the entire end surface on the proximal end sides of the rolling members 26, and a portion of the end surface on the proximal end side of the inner roller 24. Stated otherwise, by fixing the C-ring 62 inside the insertion groove 16b, the rolling members 26 and the inner roller 24 are retained between the distal end surface 16a of the spherical roller 16 and the pressing ring 60.

As shown in FIG. 1, a joint boot 68 made of rubber or resin and having a bellows portion thereon is installed between an outer circumferential surface of the transmission shaft 48 that is exposed on an outer part of the cylindrical portion 18, and an end on the side of the opening 22 of the cylindrical portion 18. A grease composition serving as a lubricant (not shown) is filled in the interior of the joint boot 68.

The constant velocity joint 10 according to the present embodiment is basically constructed in the manner described above. Hereinafter, a method of assembling the constant velocity joint 10 according to the present embodiment will be described. In such an assembly method, first, as shown in FIG. 2, a roller mounting step is performed in which the spherical rollers 16 are rotatably mounted respectively on the outer circumferential sides of the holders 54 of the inner member 14.

In this step, initially, in order to assemble each of the roller units 28, the plurality of rolling members 26, the inner roller 24, and the pressing ring 60 are arranged on the inner circumferential side of each of the spherical rollers 16 in the manner described above. In addition, the C-ring 62 is inserted into the insertion groove in a state of being reduced in diameter against the elastic force thereof, and then the C-ring 62 is expanded in diameter inside the insertion groove. Consequently, the inner roller 24, the rolling members 26, and the spherical roller 16 are assembled integrally via the pressing ring 60 and the C-ring 62. By inserting the holders 54 of the inner member 14 along the axial direction thereof into the inner rollers 24 of the roller units 28 obtained in the foregoing manner, the roller units 28 (spherical rollers 16) can be rotatably and swingably mounted on the outer circumferential sides of the holders 54.

According to the present embodiment, the roller units 28 are first assembled and then attached to the holders 54. However, the present embodiment is not particularly limited to this feature. For example, after only the inner rollers 24 have been mounted on the holders 54, the spherical rollers 16 may be mounted via the rolling members 26 on the outer circumferential sides of the inner rollers 24.

Next, as shown in FIG. 4, for example, an insertion step is performed in which the cylindrical portion 18 is arranged so that the opening 22 thereof (see FIG. 2) faces upward in the vertical direction, and while the spherical rollers 16 that are mounted on the holders 54 are rotatably accommodated respectively in the guide grooves 36, the inner member 14 and the spherical rollers 16 (roller units 28) are inserted into the cylindrical portion 18. By way of the insertion step, when the spherical rollers 16, which are disposed at the innermost location inside the cylindrical portion 18, are placed so that the axial directions (shown by P3 in FIG. 4) of the spherical rollers 16 are made perpendicular to the axial direction (the direction of arrows X1 and X2) of the cylindrical portion 18, the inner side outer circumferential surface portions 64 abut against at least parts of the first inner bottom wall portions 42, and the outer side outer circumferential surface portions 66 are separated away from the second inner bottom wall portions 44 (see FIGS. 4 and 5).

In this case, the spherical rollers 16 are urged so as to be inclined in directions in which the outer side outer circumferential surface portions 66 are placed in close proximity to the bottom surfaces of the second inner bottom wall portions 44. Stated otherwise, as shown in FIG. 3A, the spherical rollers 16, in the radial direction thereof, are easily inclined in directions in which end portions thereof facing toward the opening 22 of the outer member 12 (hereinafter also referred to as opening side end portions) separate away from the axis of the shaft hole 50. At this time, as in the present embodiment, by disposing the outer side end portions of the recesses 46 more on the outer side than the second inner bottom wall portions 44 in the radial direction of the cylindrical portion 18, the spherical rollers 16 can be inclined more suitably in the above-described directions.

Figure 6:
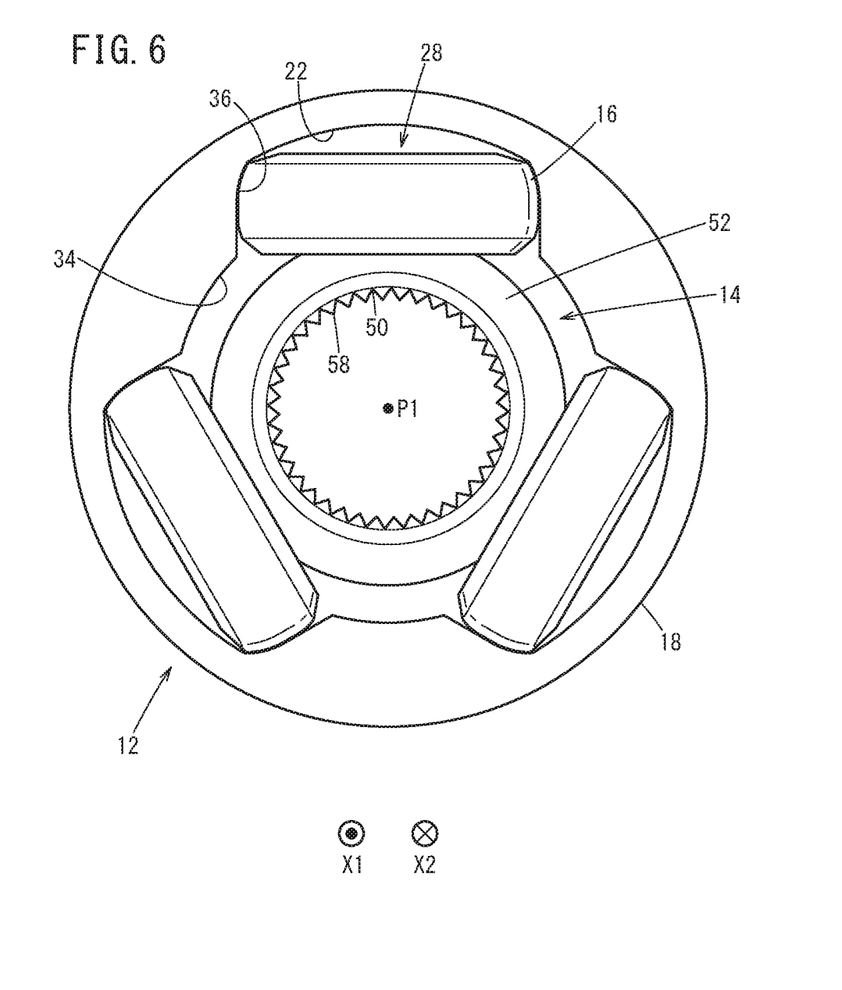
FIG. 6 is a plan view of the outer member, the inner member, and the roller units shown in FIG. 4, as viewed from the side of an opening of the cylindrical portion.

As a result, as noted previously, even if the inclined portion 40 is formed on the inner bottom wall surface 38 of the cylindrical portion 18, it is possible to prevent the spherical rollers 16 from being inclined in directions in which the opening side end portions of the spherical rollers 16 block the one end side (the side of the opening 22, the side of the arrow X1) of the shaft hole 50 (see FIG. 3B). Accordingly, as shown in FIG. 6, with the inner member 14 and the spherical rollers 16 which are disposed at the innermost location inside the cylindrical portion 18, the shaft hole 50 of the inner member 14 can be placed in a state of not being blocked by the spherical rollers 16 as viewed from the opening 22 of the cylindrical portion 18.

Figure 7:
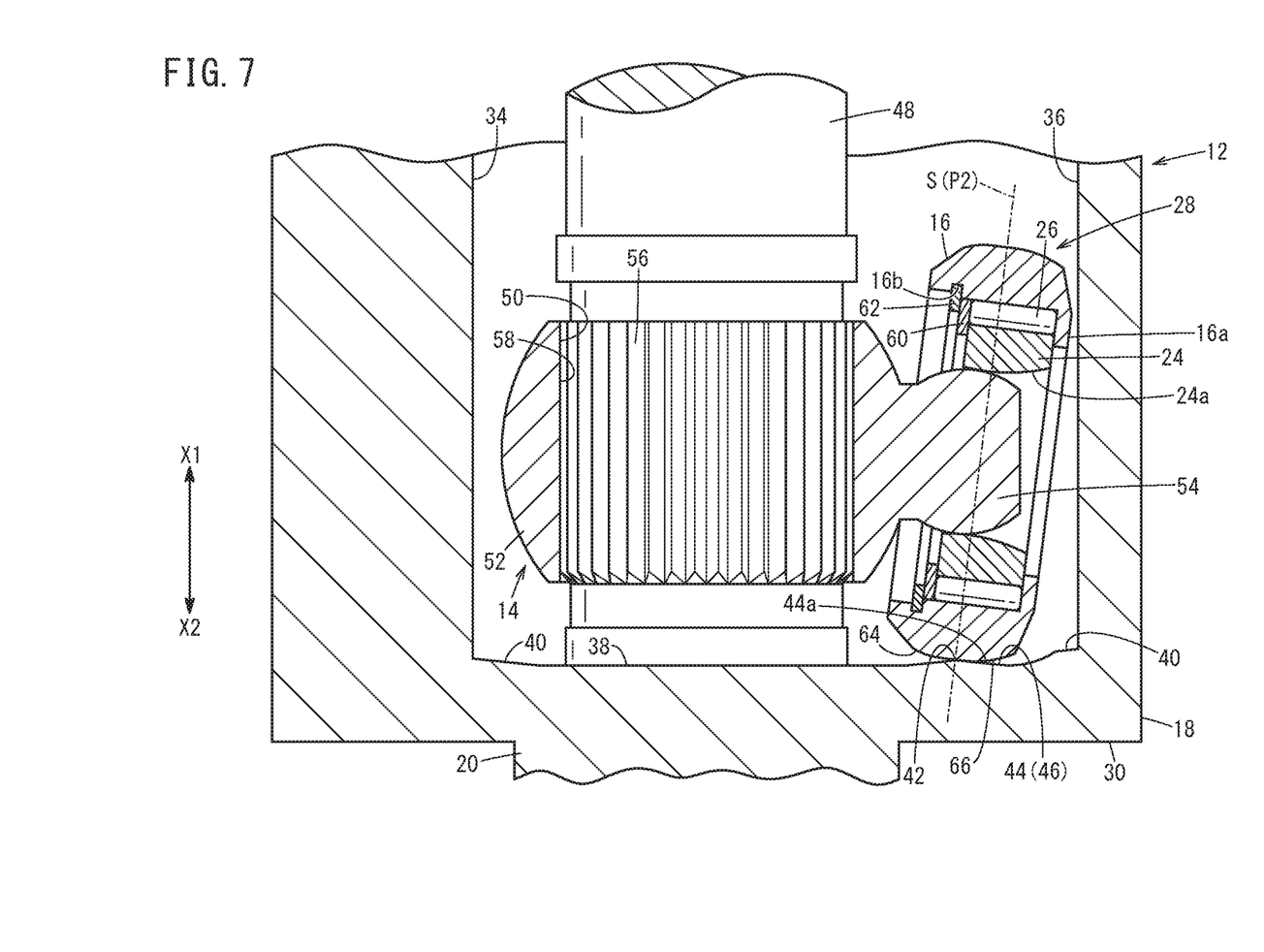
FIG. 7 is a partial cross-sectional view for describing a state in which a transmission shaft is inserted and fitted into a shaft hole of the inner member shown in FIG. 4.

Next, a transmission shaft connecting step is performed in which the transmission shaft 48 is inserted and fitted into the shaft hole 50 of the inner member 14, which is disposed at the innermost location inside the cylindrical portion 18 (see FIG. 7). At this time, as described above, since the one end side of the shaft hole 50 is not blocked by the spherical rollers 16, the transmission shaft 48 can be easily inserted and fitted from the one end side toward the other end side of the shaft hole 50, and the inner member 14 and the other end of the transmission shaft 48 can be efficiently connected.

Moreover, although not illustrated in FIG. 7, the other end of the transmission shaft 48 may be connected to the inner member 14 in a state in which the transmission shaft 48 is inserted through the joint boot 68 (see FIG. 1), and after the other end of the transmission shaft 48 and the inner member 14 have been connected, the joint boot 68 may be inserted from the one end of the transmission shaft 48. Further, the aforementioned fixed type constant velocity joint may be connected in advance to the one end side of the transmission shaft 48 before the other end of the transmission shaft 48 and the inner member 14 are connected, or alternatively, the aforementioned fixed type constant velocity joint may be connected to the one end side of the transmission shaft 48 after the other end of the transmission shaft 48 and the inner member 14 have been connected.

As can be understood from the description given above, with the constant velocity joint 10 and the method of assembling the same according to the present embodiment, when the spherical rollers 16 are disposed (as a reference state) at an innermost location inside the cylindrical portion 18 so that the axial directions of the spherical rollers 16 are perpendicular to the axial direction of the cylindrical portion 18, the first inner bottom wall portions 42 can be made to abut against the inner side outer circumferential surface portions 64, and the outer side outer circumferential surface portions 66 can be separated away from the second inner bottom wall portions 44 (see FIGS. 4 and 5). Consequently, since the opening side end portions of the spherical rollers 16 can be prevented from coming into proximity to the axis of the shaft hole 50 and blocking the shaft hole 50, the transmission shaft 48 can be efficiently inserted and fitted into the shaft hole 50. Stated otherwise, even if the diameter of the spherical rollers 16 is increased, the constant velocity joint 10 can be assembled in an efficient manner.

In the constant velocity joint 10 and the method of assembling the same according to the above-described embodiment, the second inner bottom wall portions 44 include the recesses 46 that are recessed toward a side away from the opening 22. In this case, by means of a simple configuration in which the recesses 46 are provided on the inner bottom wall surface 38 of the cylindrical portion 18, the inner bottom wall surface 38 of the cylindrical portion 18 can be shaped so that the first inner bottom wall portions 42 are closer in proximity to the side of the opening 22 than the second inner bottom wall portions 44. More specifically, in the reference state, at least parts of the first inner bottom wall portions 42 can be made to abut against the inner side outer circumferential surface portions 64, and the outer side outer circumferential surface portions 66 can be separated away from the second inner bottom wall portions 44. Therefore, the constant velocity joint 10 can be assembled in an efficient manner while suppressing a decrease in manufacturing efficiency and molding ability, etc., of the outer member 12.

In the constant velocity joint 10 and the method of assembling the same according to the present embodiment, the inner bottom wall surface 38 includes the inclined portion 40 which is closer in proximity to the side of the opening 22 as it progresses from the center side toward the outer side in the radial direction of the cylindrical portion 18, and the recesses 46 include the reversely inclined portions 44a which are inclined in an opposite direction to the inclination direction of the inclined portion 40 by coming closer in proximity to the side of the opening 22 as they progress from the outer side toward the center side in the radial direction of the cylindrical portion 18. In this case as well, by means of a simple configuration, at least parts of the first inner bottom wall portions 42 can be made to abut against the inner side outer circumferential surface portions 64, and the outer side outer circumferential surface portions 66 can be separated away from the second inner bottom wall portions 44.

In the constant velocity joint 10 and the method of assembling the same according to the present embodiment, the outer side end portions of the recesses 46 are disposed more on an outer side than the second inner bottom wall portions 44 in the radial direction of the cylindrical portion 18. In this case, it is possible to more effectively avoid the sides of the spherical rollers 16, which are more on the distal end side than the virtual plane S, from coming into contact with the inner bottom wall surface 38, and therefore, the opening side end portions of the spherical rollers 16 can be easily inclined in directions away from the axis of the shaft hole 50. Moreover, insofar as the recesses 46 are provided so that the second inner bottom wall portions 44 and the outer side outer circumferential surface portions 66 can be spaced apart from each other in the reference state, the dimensions and shapes thereof are not particularly limited. Accordingly, the outer side end portions of the recesses 46 may also be disposed in closer proximity to the center side than the second inner bottom wall portions 44 in the radial direction of the cylindrical portion 18.

Figure 8:
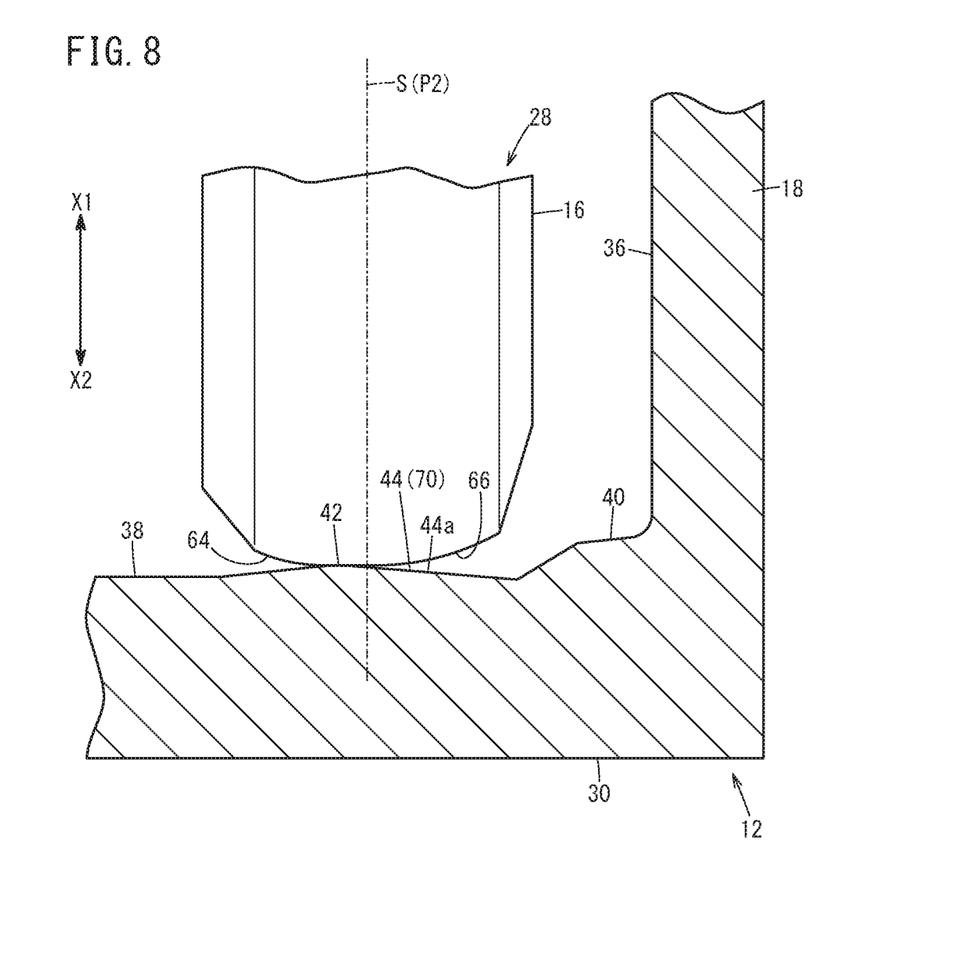
FIG. 8 is an enlarged cross-sectional view of a principal part for describing an inner bottom wall surface of the cylindrical portion according to a modification of FIG. 5.

Further, the recesses 46 are configured so that the inner wall surfaces thereof are constituted by curved surfaces. However, the present invention is not particularly limited to this feature, and for example, the inner wall surfaces may be constituted by flat surfaces, as in recesses 70 shown in FIG. 8.

Figure 9:
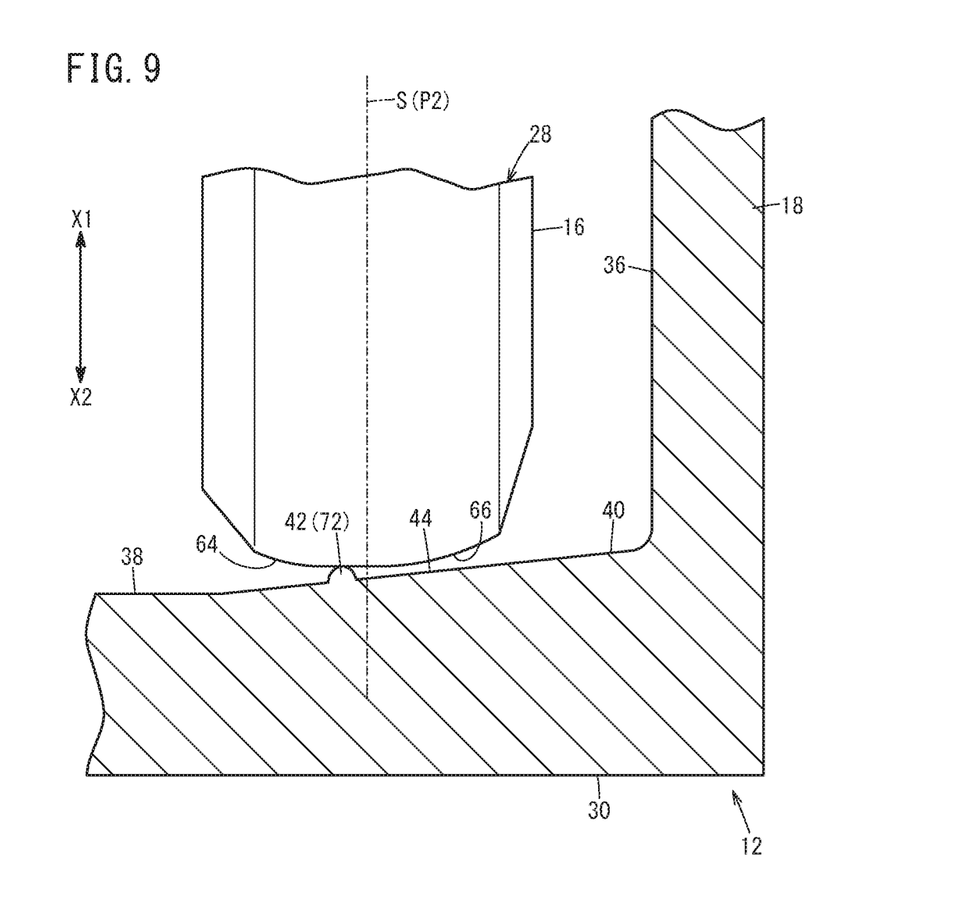
FIG. 9 is an enlarged cross-sectional view of a principal part for describing an inner bottom wall surface of the cylindrical portion according to another modification of FIG. 5.

Further, the inner bottom wall surface 38 of the cylindrical portion 18 may be shaped so that the first inner bottom wall portions 42 are closer in proximity to the side of the opening 22 than the second inner bottom wall portions 44, by a method other than providing the recesses 46, 70 on the second inner bottom wall portions 44. For example, as shown in FIG. 9, the first inner bottom wall portions 42 may include protrusions 72 that project toward the side of the opening 22 (see FIG. 1). In this case as well, in the reference state, the inner side outer circumferential surface portions 64 and parts of the first inner bottom wall portions 42 can be made to abut against each other, and the outer side outer circumferential surface portions 66 and the second inner bottom wall portions 44 can be separated away from each other. Therefore, even if the diameter of the spherical rollers 16 is increased, it is possible to avoid a situation in which the shaft hole 50 is blocked by the spherical rollers 16, and the constant velocity joint 10 can be assembled in an efficient manner.

Although not illustrated, by providing the recesses 46 (or the recesses 70) on the second inner bottom wall portions 44, and further providing the protrusions 72 on the first inner bottom wall portions 42, the inner bottom wall surface 38 of the cylindrical portion 18 may be shaped so that the first inner bottom wall portions 42 are closer in proximity to the side of the opening 22 than the second inner bottom wall portions 44.

In the constant velocity joint 10 according to the above-described embodiment, the spherical rollers 16 are rotatably mounted via the rolling members 26 on the outer circumferential sides of the inner rollers 24 that are swingably attached to the holders 54. Further, in the roller mounting step of the method of assembling the constant velocity joint 10 according to the above-described embodiment, the spherical rollers 16 are mounted on the holders 54 via the inner rollers 24 and the rolling members 26, and the inner rollers 24 are swingably attached to the holders 54.

In this manner, when the spherical rollers 16 (roller units 28) are disposed so as to be capable of swinging with respect to the holders 54, it is made easy for the radial directions of the spherical rollers 16 to be inclined with respect to the axis of the shaft hole 50 (see FIG. 3A and FIG. 3B). Even in such a case, due to the configuration in which the first inner bottom wall portions 42 and the second inner bottom wall portions 44 are provided on the inner bottom wall surface 38 of the cylindrical portion 18, it is possible to prevent a situation in which the opening side end portions of the spherical rollers 16 come into proximity to the axis of the shaft hole 50. Accordingly, it is possible to effectively prevent the operation of inserting and fitting the transmission shaft 48 into the shaft hole 50 from being hindered, and the efficiency in assembling the constant velocity joint 10 can be enhanced.

In the constant velocity joint 10 according to the above-described embodiment, the outer diameter of the spherical rollers 16 is larger than the length of the annular section 52 in the axial direction. Further, in the method of assembling the constant velocity joint 10 according to the above-described embodiment, in the roller mounting step, the spherical rollers 16, the outer diameter of which is larger than the length of the annular section 52 in the axial direction, are mounted on the holders 54.

In accordance with this feature, by increasing the outer diameter of the spherical rollers 16, the torque that is capable of being transmitted between the outer member 12 and the inner member 14 can be increased. However, by increasing the diameter of the spherical rollers 16, when the spherical rollers 16 and the inner member 14 are disposed at the innermost location of the cylindrical portion 18, it becomes easy for the shaft hole 50 to be blocked by the spherical rollers 16. Even in such a case, as noted previously, due to the configuration in which the first inner bottom wall portions 42 and the second inner bottom wall portions 44 are provided on the inner bottom wall surface 38 of the cylindrical portion 18, since it is possible to prevent the operation of inserting and fitting the transmission shaft 48 into the shaft hole 50 from being hindered, the efficiency in assembling the constant velocity joint 10 can be enhanced.

The present invention is not particularly limited to the above-described embodiments, and various modifications may be adopted therein without departing from the essence and gist of the present invention.

What is claimed is:

1. A method of assembling a constant velocity joint comprising spherical rollers configured to transmit torque between an outer member and an inner member, the method comprising:
    a roller mounting step of rotatably mounting the spherical rollers having annular shapes, respectively on outer circumferential sides of holders of the inner member, the inner member including an annular section in which a shaft hole is formed, and the holders that protrude from an outer circumference of the annular section along radial directions of the annular section;
    an insertion step of inserting the inner member and the spherical rollers that are mounted on the holders, from an opening provided on one end side of a bottomed cylindrical portion of the outer member into the cylindrical portion; and
    a transmission shaft connecting step of inserting and fitting a transmission shaft into the shaft hole of the inner member which is disposed at an innermost location inside the cylindrical portion, wherein
    a first inner bottom wall portion and a second inner bottom wall portion are provided on an inner bottom wall surface of the cylindrical portion, the first inner bottom wall portion is disposed in closer proximity to a center side in a radial direction of the cylindrical portion than the second inner bottom wall portion, and at least a part of the first inner bottom wall portion is formed in closer proximity to a side of the opening than the second inner bottom wall portion;
    an outer circumferential surface of each of the spherical rollers includes an inner side outer circumferential surface portion disposed more on a proximal end side of the holders than a virtual plane passing through a center of the spherical roller in an axial direction and extending along a radial direction of the spherical roller, and an outer side outer circumferential surface portion disposed more on a distal end side of the holders than the virtual plane; and
    when the axial directions of the spherical rollers, which are disposed at the innermost location inside the cylindrical portion, are perpendicular to an axial direction of the cylindrical portion, at least a part of the first inner bottom wall portion, which is a portion facing toward the inner side outer circumferential surface portion, abuts against the inner side outer circumferential surface portion, and the second inner bottom wall portion, which is a portion facing toward the outer side outer circumferential surface portion, is separated away from the outer side outer circumferential surface portion.

2. The method of assembling a constant velocity joint according to claim 1, wherein the second inner bottom wall portion has a recess that is recessed toward a side away from the opening.

3. The method of assembling a constant velocity joint according to claim 2, wherein:
    the inner bottom wall surface includes an inclined portion which is closer in proximity to the side of the opening as the inclined portion progresses from a center side toward an outer side in the radial direction of the cylindrical portion; and
    the recess includes a reversely inclined portion (44a) which is inclined in an opposite direction to an inclination direction of the inclined portion by coming closer in proximity to the side of the opening as the reversely inclined portion progresses from the outer side toward the center side in the radial direction of the cylindrical portion.

4. The method of assembling a constant velocity joint according to claim 2, wherein an outer side end portion of the recess is disposed more on an outer side than the second inner bottom wall portion in the radial direction of the cylindrical portion.

5. The method of assembling a constant velocity joint according to claim 1, wherein the first inner bottom wall portion has a protrusion that projects toward the side of the opening.

6. The method of assembling a constant velocity joint according to claim 1, wherein, in the roller mounting step, the spherical rollers are mounted on the holders via inner rollers and rolling members, and the inner rollers are swingably attached to the holders.

7. The method of assembling a constant velocity joint according to claim 1, wherein, in the roller mounting step, the spherical rollers each having an outer diameter larger than a length of the annular section in an axial direction are mounted on the holders.

* * * * *